(12) United States Patent
Tuna et al.

(10) Patent No.: US 10,120,019 B2
(45) Date of Patent: Nov. 6, 2018

(54) AUTOMATED METHOD FOR ANALYZING A BOARD HAVING A PLURALITY OF FPGA COMPONENTS

(71) Applicant: Mentor Graphics Corporation, Wilsonville, OR (US)

(72) Inventors: Matthieu Tuna, Paris (FR); Zied Marrakchi, Paris (FR); Christophe Alexandre, Pantin (FR)

(73) Assignee: Mentor Graphics Corporation, Wilsonville, OR (US)

( * ) Notice: Subject to any disclaimer, the term of this patent is extended or adjusted under 35 U.S.C. 154(b) by 62 days.

(21) Appl. No.: 14/907,501

(22) PCT Filed: Jul. 8, 2014

(86) PCT No.: PCT/EP2014/064634
§ 371 (c)(1),
(2) Date: Jan. 25, 2016

(87) PCT Pub. No.: WO2015/010898
PCT Pub. Date: Jan. 29, 2015

(65) Prior Publication Data
US 2016/0161551 A1 Jun. 9, 2016

(30) Foreign Application Priority Data

Jul. 26, 2013 (FR) ..................................... 13 57416

(51) Int. Cl.
G06F 17/50 (2006.01)
G01R 31/28 (2006.01)
G01R 31/317 (2006.01)

(52) U.S. Cl.
CPC ..... *G01R 31/2882* (2013.01); *G01R 31/2834* (2013.01); *G01R 31/31725* (2013.01);
(Continued)

(58) Field of Classification Search
CPC ............ G01R 31/2834; G01R 31/2882; G01R 31/31725; G06F 17/5027; G06F 17/5031; G06F 17/5054
See application file for complete search history.

(56) References Cited

U.S. PATENT DOCUMENTS 5,850,537 A 12/1998 Selvidge et al.
7,007,254 B1 * 2/2006 Borkovic ............ G06F 17/5045
716/113
(Continued)

OTHER PUBLICATIONS

Abdellah-Medjadji et al,. "Large Scale On-Chip Networks: An Accurate Multi-FPGA Emulation Platform," *11$^{th}$ Euromicro Conference on Digital System Design Architectures, Methods and Tools*, 7 pp. (Sep. 2008).

(Continued)

*Primary Examiner* — Vuthe Siek

(57) ABSTRACT

The disclosed technology relates to analyzing an electronic board having a plurality of FPGAs that are interconnected and programmed to implement a logic design. One example method comprises: setting up a graph representing the board; determining, for each FPGA, by means of an FPGA-specific static temporal analysis tool, the time for travelling over each path portion that passes through said FPGA, each travel time corresponding to the sum of the times for carrying out the logical operations applied to the signal in the FPGA; determining the inter-FPGA time for travelling over each inter-FPGA portion represented by a link in the graph; and determining the time for travelling over each path of the board by summing the intra-FPGA travel times and the inter-FPGA travel times associated with each link of the graph.

20 Claims, 2 Drawing Sheets

(52) U.S. Cl.
    CPC ...... *G06F 17/5027* (2013.01); *G06F 17/5031* (2013.01); *G06F 17/5054* (2013.01)

(56) References Cited

U.S. PATENT DOCUMENTS

| | | | |
|---|---|---|---|
| 7,657,855 B1 | 2/2010 | Manaker, Jr. et al. | |
| 7,853,911 B1 * | 12/2010 | Fung | G06F 1/10 716/113 |
| 7,886,256 B1 | 2/2011 | Jha et al. | |

OTHER PUBLICATIONS

International Search Report dated Sep. 8, 2014, from International Patent Application No. PCT/EP2014/064634, 7 pp.
Tessier, "Multi-FPGA Systems: Logic Emulation," in *Reconfigurable Computing: The Theory and Practice of FPGA-Based Computation*, Chapter 30, pp. 637-669 (Jan. 2008).
Written Opinion dated Sep. 8, 2014, from International Patent Application No. PCT/EP2014/064634, 4 pp. (English translation not available).

* cited by examiner

AUTOMATED METHOD FOR ANALYZING A BOARD HAVING A PLURALITY OF FPGA COMPONENTS

CROSS REFERENCE TO RELATED APPLICATIONS

This application is the U.S. National Stage of International Patent Application No. PCT/EP2014/064634, filed Jul. 8, 2014, which in turn claims priority to and the benefit of French Patent Application No. 2013-057416, filed Jul. 26, 2013.

The invention relates to the prototyping of an ASIC circuit by means of a system of multi-FPGA type, such as an electronic board having a plurality of interconnected FPGA circuits.

BACKGROUND OF THE INVENTION

In practice, the development of an ASIC (Application-Specific Integrated Circuit) circuit stretches over a duration of the order of several months, which is relatively long in relation to the development cycle of modern electronic devices.

To test the functionality of a device such as a smartphone, parallel to the development of each ASIC circuit that it must comprise, a prototype of each ASIC circuit is produced in the form of a system with FPGA components.

An FPGA (Field-Programmable Gate Array) component is a programmable logic array able to be reprogrammed after its manufacture.

On account of the large, and growing, computational power of the ASIC circuits having to be prototyped, it is necessary to use not one FPGA component, but a plurality of FPGA components interconnected by an electronic board bearing them so as to implement the logic design in the FPGA system.

To develop a multi-FPGA prototype, the logic design, i.e. the functional behavior to be implemented, takes the form of a list of logical interconnections (commonly known as a design netlist), the definition of the board taking the form of a list of interconnections between FPGA components (commonly known as a board netlist), which defines each FPGA and the connections between these FPGAs.

Such a system thus comprises, on the one hand, flip-flops, i.e. FPGA sequential cells; it is possible to consider a flip-flop as a starting or end point of a synchronization path, depending on whether the synchronization path in question starts at this cell or ends at this cell.

It also comprises, on the other hand, assemblies of FPGA logic cells that communicate with each other using signals, these logic cells being considered bystanders in the synchronization path. A logic cell may thus be neither a starting point nor an end point, but be characterized by the delay that it introduces in the synchronization path of which it is a part.

Timing analysis is the calculation of the expected synchronization: the travel time of the longest synchronization path between a starting-point flip-flop and an end-point flip-flop allows the system clock frequency at which the board will be able to operate to be determined.

Currently, solely an FPGA timing analysis, called an "intra-FPGA timing analysis", is automatically carried out, this making it possible to determine the maximum permissible clock frequency for each FPGA analyzed.

In practice, a frequency analysis based on a complete model of the entirety of the multi-FPGA board, representing all of the logic cells of the system, is impossible, as it would require a colossal computational power and memory capacity, on account of the very large area that modern multi-FPGA boards can have.

SUBJECT OF THE INVENTION

The invention provides a solution for automatically carrying out a timing analysis of a system project on such a board in its entirety.

SUMMARY OF THE INVENTION

For this purpose, the subject of the invention is an automated method for analyzing an integrated circuit implemented on an electronic board having a plurality of programmable chips of FPGA type, interconnected and programmed according to a predetermined logic design, this board setting up inter-chip links connecting logic blocks belonging to various chips so as to form paths each intended to have a signal travel therethrough, each path comprising at least two intra-chip portions and at least one inter-chip portion, this method comprising:
  setting up a graph representing the board and wherein each link represents an inter-chip portion or an intra-chip portion;
  determining, for each chip, the travel time for each portion of path traversing this chip, each travel time corresponding to the sum of the times for carrying out the logical operations applied to the signal in the chip;
  determining the inter-chip travel time for each inter-chip portion represented by a link in the graph;
  determining the travel time for each path of the system implemented on the board, by summation of the intra-chip travel times and the inter-chip travel times associated with each link in the graph.

The invention also relates to a method thus defined, wherein the determination of the intra-chip and inter-chip times are based on:
  a standard delay value introduced by every logic cell of the system for the intra-chip portions, or a value arising from a programmable-chip-specific static timing analysis tool for the intra-chip portions;
  the lengths of the physical tracks or a value arising from a board-specific static timing analysis tool for the inter-chip portions.

The invention also relates to a method thus defined, wherein the travel time for an inter-chip portion is a delay introduced by a single physical track, or a delay corresponding to the addition of an integrated serializer and an integrated deserializer to the chips respectively located upstream and downstream of this track in the case of a multiplexed track.

The invention also relates to a method thus defined, wherein the delay time introduced by a serializer and by a deserializer is evaluated by taking into account the processing rank of the signal flowing in the path relative to the other signals.

The invention also relates to a method thus defined, comprising the determination, for each signal transiting a multiplexed portion before being delivered to a chip, of the instant at which this signal is emitted from the starting chip and of the instant at which this signal is delivered to the destination chip.

The invention also relates to a method thus defined, comprising, in the event of a multiplexed signal synchronization violation, the determination of a change in the processing order of the signals in the serializer and the deserializer ensuring the multiplexing, so as to remove the synchronization violation.

DETAILED DESCRIPTION OF THE INVENTION

The invention is based on the observation according to which, in an electronic board comprising multiple interconnected FPGA-type components, it is the links between FPGA components which negatively affect the operating frequency, and not the FPGA components themselves.

Specifically, the performance of FPGA components is very regularly improved, both in terms of operating frequency and computational power, but the number of elements connecting these components progresses very little. It follows that while the processing of information within an FPGA component gets faster and faster, the transfer of data from one FPGA to another remains limited to transfer rates which are too low and which make little progression with regard to the processing power of the FPGA components.

According to the invention, a complete static timing analysis of the board is carried out by using computer simulation tools supplied with the FPGA circuits, which are used to determine the intra-FPGA delays, and by constructing a synchronization graph making it possible to characterize the delays introduced in each inter-FPGA link.

Once the synchronization graph has been completely constructed, each FPGA is represented therein mainly by the delays that it introduces in each synchronization path passing therethrough, and each link in this graph represents a communication channel between two FPGAs, which channel is characterized by the delay it introduces.

In the description below, the invention is presented within the context of an implementation with FPGA chips, but it applies to actual FPGA chips and to an implementation with CPLD (Complex Programmable Logic Device) chips, or indeed with PLA (Programmable Logic Array) or PSoC (Programmable System On Chip) chips, or even with any programmable chip equivalent to FPGA chips.

First Step

The multi-FPGA board was designed in order to implement a logic design defined, firstly, by a list of interconnections (of the "Verilog netlist" type), which is divided and segmented according to the number of FPGAs that the board comprises, in order to produce a synchronization graph for the system. This list of interconnections thus defines the parts of the design contained in each FPGA and the communications between the FPGAs.

Starting from this divided and segmented list of interconnections, a first version of the synchronization graph is set up, which in particular defines the various links connecting each FPGA to another FPGA on the board, and in which each FPGA is represented in a partial form, mainly giving the delays introduced by the FPGA in each synchronization path that passes therethrough.

Communication between the various parts is represented in the graph in the form of single links: these links do not reflect the organization of the physical tracks of the board and the possible multiplexed tracks, as the routing per se has not yet been defined.

Figure 1:
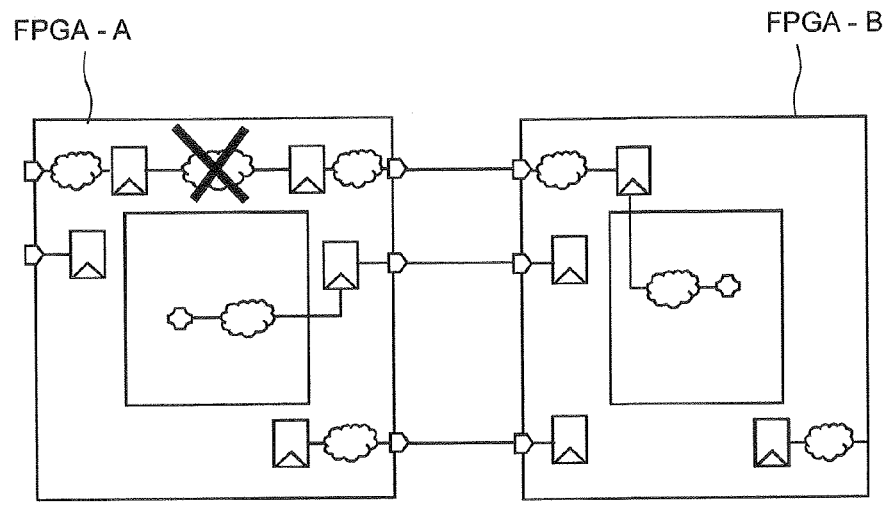
FIG. 1 is a diagrammatic representation showing two FPGA components borne by an electronic board while being linked to each other by tracks.

Thus, in the example in FIG. 1, two FPGA components are shown, denoted by FPGA-A and FPGA-B, which communicate with each other by way of three links. These three links are represented by three lines in FIG. 1, but they do not necessarily correspond to three separate physical tracks. Eventually, these three links will possibly, depending on the choices made during the routing operation, be passed, in a serialized manner, on one and the same track that they will share, or indeed even transit three separate physical tracks.

A first static timing analysis before routing can thus be carried out based on this synchronization graph. The time delays between the FPGAs and the time delays within each FPGA are at this stage estimations because the serializers and deserializers required for the actual routing have not yet been integrated in the FPGAs.

This first step is carried out by computing means in an entirely automated manner: on the one hand, an estimation of the transfer time is established for each portion of synchronization path passing through an FPGA, by assuming that the delay introduced by any given cell has a predetermined standard value and by counting the number of cells passed through by each intra-FPGA portion. Additionally, the transfer time of the signals transiting each inter-FPGA link is estimated, for example based on the length of the existing tracks and the transfer speed of signals on such tracks.

This first analysis constitutes an evaluation which advantageously serves to carry out an integrity check, i.e. to detect possible significant design errors leading to transmission delays which are considerably too high.

Second Step

The routing of the board is next set up using computing means to define the single tracks and the multiplexed tracks of the board. Each single track ensures the transfer of a single signal from one FPGA to another, and each multiplexed track ensures the transfer of multiple signals from one FPGA to another, by means of a serializer and a deserializer located upstream and downstream of this track.

The multiplexing or serialization serves to increase the bandwidth of the FPGAs and to compensate for the limited number of physical tracks on the board. In the case in which the number of signals being communicated between a pair of programmable chips exceeds the number of physical connections on the board, certain signals are multiplexed in order to share the same physical connection. The number of multiplexed signals corresponds to the degree of multiplexing. The higher the degree of multiplexing, the higher the time required to send the data in series and consequently the lower the frequency of the system. The choice of the signals to multiplex and their degree of multiplexing depends on their criticality. The criticality of a signal is a function of the length/lag of the combinational paths to which it belongs. On the basis of the timing analysis of the system, the lag of each path is determined and thus the criticality of the signals is calculated. The more critical the signal (belonging to a very long path), the lower its degree of multiplexing. It is possible to go as far as not multiplexing certain critical signals (degree of multiplexing=1).

Figure 2:
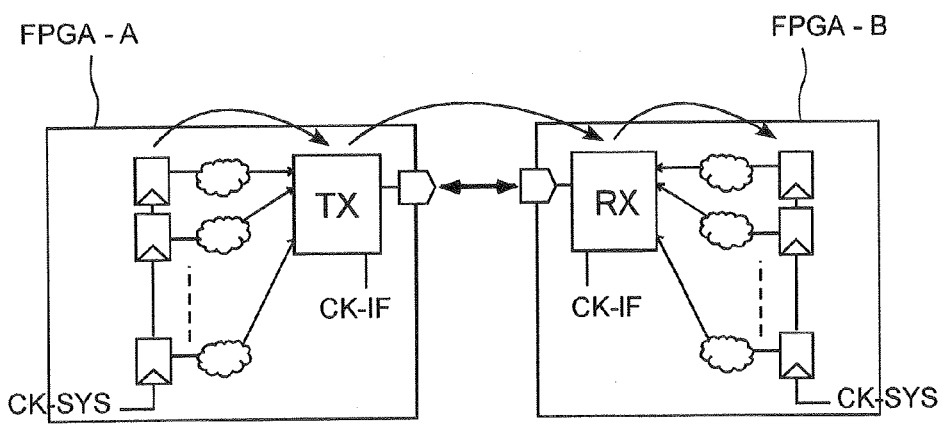
FIG. 2 is a diagrammatic representation showing two FPGA components linked to each other by a transmission track preceded by a serializer and followed by a deserializer.

The serialization step gathers a certain number of signals to be routed via a single physical track, as illustrated diagrammatically in FIG. 2. For each multiplexed track, a serializer is added in the synchronization graph to the FPGA located upstream of the multiplexed track, and a deserializer is added in this graph to the FPGA located downstream of the multiplexed track.

In the example in FIG. 2, the serializer denoted by TX is integrated into the component bearing the FPGA-A, and the deserializer RX is integrated into the component bearing the FPGA-B.

Figure 3:
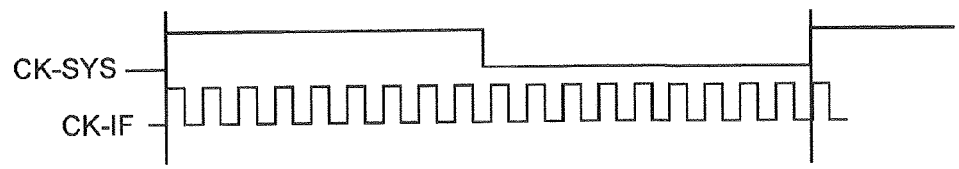
FIG. 3 is a diagrammatic representation showing a system clock signal and a faster clock signal dedicated to driving a serializer or a deserializer.

It will be noted that the board uses a base clock, denoted by CK-SYS, while the serializer TX and deserializer RX use a fast clock, denoted by CK-IF, which is for example around 20 times faster than the basic clock, as illustrated in FIG. 3. This fast clock drives the serializer so that it quickly dispatches the data to the deserializer via the physical track before the next rising edge of the CK-SYS.

The synchronization graph is then completed by adding thereto the time delays introduced by each single track and by each multiplexed track. Each delay added is thus a physical track delay, and potentially a serializer/deserializer delay if these elements have been inserted.

At this stage, the synchronization delays within the FPGAs are still an estimation, i.e. inexact values, due to the fact that the serializers and deserializers have not yet actually been integrated into the FPGAs.

Third Step

The definition of each FPGA is then completed by the addition of serializers and deserializers upstream and downstream of each multiplexed track, so that it is possible to carry out a precise timing analysis for each FPGA. This analysis is carried out by means of computer simulation tools which are supplied with the FPGA components.

These tools now make it possible to evaluate in a precise manner, for each synchronization path passing through an FPGA component, the delay time introduced by the FPGA, as the definition of each FPGA has, where appropriate, been completed by the addition of serializers and deserializers.

This analysis provides a file containing all of the timing information for each FPGA, thereby allowing the delay times introduced by each FPGA for each synchronization path transited by a signal to be determined.

Based on the timing analysis of each FPGA, the synchronization graph is completed in such a way as to integrate therein all of the delays introduced by the FPGA circuits, in each synchronization path.

The synchronization graph comprises sufficient elements to carry out a precise static timing analysis of the entirety of the board, as the totality of the exact timing information is now known and contained in this synchronization graph. The delay for each intra-FPGA portion of synchronization path and for each inter-FPGA portion of synchronization path is thus known.

This synchronization graph can thus be simplified to show only the input connections at the first stage of the flip-flops of the FPGAs, and the connections at the last stage of the flip-flops at the FPGA outputs, including the flip-flops and the clock tree controlling these flip-flops, as illustrated diagrammatically in FIG. 1.

This synchronization graph is thus made intentionally partial by not integrating the complete explicit definition of the contents of each FPGA, thereby making it possible to rapidly carry out a precise static timing analysis.

In the static timing analysis according to the invention, the serializers and the deserializers integrated into the FPGAs are considered as any type of combinational logic. The invention thus makes it possible to precisely determine the synchronization between two FPGAs, between two system flip-flops, even if serializers/deserializers are introduced.

Signal Arriving Too Late

By virtue of this static timing analysis of the entirety of the board, it is possible, among other things, to identify the cases in which a multiplexed signal arrives too late in the FPGA to which it is delivered, and the cases in which a multiplexed signal arrives too early in the FPGA to which it is delivered.

This type of situation is due to the fact that the clocks CK-SYS of the various FPGAs of the board are in practice out of phase with respect to one another. The clock signals of each FPGA are synchronized with one and the same common clock CK-SYS of the electronic board, according to a clock tree integrating logic elements for activating and deactivating the clock of each FPGA depending on whether or not it is needed, in order to limit power consumption. These logic elements introduce different delays in the clocks CK-SYS of each FPGA.

Figure 4:
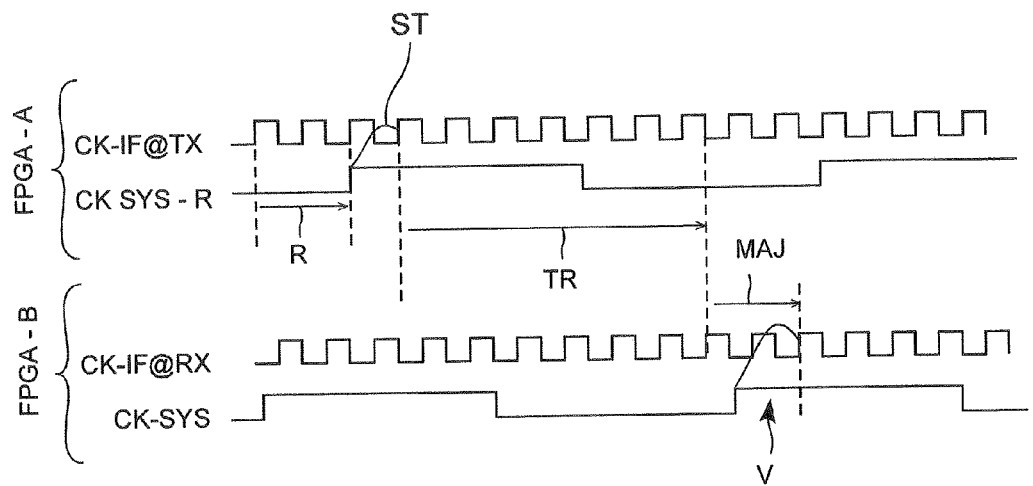
FIG. 4 is a diagrammatic representation showing a case of a synchronization violation due to a signal arriving too late in the FPGA to which it is delivered.

When a signal arrives too late, as in FIG. 4, and is not picked up by the correct clock edge in the FPGA to which it is delivered, this constitutes a violation of the synchronization.

In the case of FIG. 4, this is due to the fact that the system clock CK-SYS-R, in the FPGA-A from which the signal is emitted, is delayed by the value R with respect to the system clock CK-SYS in the FPGA-B receiving the signal, reducing the available global transfer time, and thereby causing a delay at the level of the delivered signal.

As illustrated in this FIG. 4, the signal first undergoes the delay R and is transmitted to the serializer TX in the FPGA-A while being delayed by a stabilization time ST before being transmitted over the physical track, thereby introducing an additional transmission delay denoted by TR. The various signals received in the deserializer RX of the FPGA-B next undergo an updating delay, denoted by MAJ, before being delivered in the FPGA-B.

As may be seen in FIG. 4, the instant at which the signal is delivered in the FPGA-B, represented by a vertical dotted line, is too late with respect to the rising edge of the clock CK-SYS, so that this signal is not correctly picked up by the FPGA-B that receives it, this corresponding to the synchronization violation denoted by V.

Signal Arriving Too Early

Figure 5:
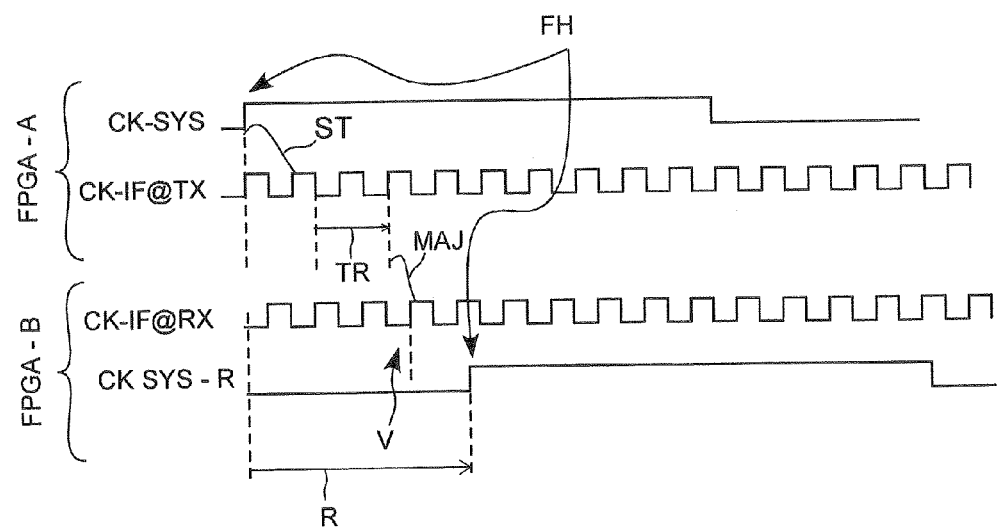
FIG. 5 is a diagrammatic representation showing a case of a synchronization violation due to a signal arriving too early in the FPGA to which it is delivered.

When a signal arrives too early and is not picked up by the correct clock edge in the FPGA to which it is delivered, as in the case of FIG. 5, this constitutes another type of violation of the synchronization.

This situation typically corresponds to the specific case in which the clock CK-SYS-R of the FPGA-B that receives the signal is delayed by a value R with respect to the clock FPGA-A from which the signal is emitted.

In the situation in FIG. 5, the value of the delay R is of the order of a quarter of the period of the clock CK-SYS, so that the signal is emitted by the FPGA-A on a certain clock edge denoted by FH, but it is received in the FPGA-B by the same clock edge FH, delayed by the value R.

Once again, the signal first undergoes a delay ST corresponding to its stabilization in the serializer, before undergoing another delay TR corresponding to its transmission over the physical track, after which it undergoes another delay corresponding to the updating MAJ of this signal in the deserializer before delivery in the FPGA-B.

In the case of FIG. 5, the sum of the delays ST, TR and MAJ is smaller than the delay R of the system clock CK-SYS-R of the FPGA-B with respect to the system clock CK-SYS of the FPGA-A, so that the signal that is emitted on the rising edge FH from the FPGA-A is picked up on the same rising edge of the system clock of the FPGA-B which is out of phase.

Correction of Violations of Synchronization

According to the invention, the specific case in which a multiplexed signal arrives too early and in which a multiplexed signal arrives too late is corrected by rearranging the processing order of the signals in the serializer and in the deserializer.

The timing constraints are resolved when the inter-FPGA and intra-FPGA synchronizations are also resolved. The timing analysis flow over the entire board takes place as follows:

Thus, the timing analysis is first carried out on the synchronization graph containing all of the timing information of each FPGA and of the communications between FPGAs.

Next, on the basis of signals leading to synchronization conflicts (arriving to late or too early), rearrangements are made in the serializers and deserializer. In the event of a signal arriving too late, its processing rank is decreased so that it is processed and transmitted before the others, in order for it not to arrive too late. In the event of a signal arriving too early, its processing rank is increased so that it is processed and transmitted after the others, in order for it not to arrive too early.

Rearranging signals: the process calculates the delay of each signal and rearranges them to resolve the timing constraints. This step also generates the new timing constraints for the FPGA, as it leads to a modification of the characteristics of the serializer and of the deserializer which are integrated into FPGAs. Ultimately, only the intra-FPGA timing analysis must be redone in order to check whether the synchronization is resolved or not with regard to the totality of the signals.

The invention claimed is:

1. An automated method for developing a multi-FPGA prototype of an application-specific integrated circuit (ASIC), wherein the multi-FPGA prototype is implemented on an electronic board having a plurality of FPGA-type programmable chips (FPGAs) including a first FPGA and a second FPGA, the method comprising:
   segmenting a netlist of the ASIC according to a number of the plurality FPGAs;
   constructing a synchronization graph having a plurality of edges which correspond to communication paths of the netlist from respective originating sequential cells to respective destination sequential cells;
   in at least one case where a subset of the communication paths being communicated between the first and second FPGAs exceeds a number of physical connections between the first and second FPGAs on the electronic board:
      determining travel times of each of the subset of the communication paths for respective signals by combining:
         a first intra-FPGA travel time corresponding to time required to perform one or more logical operations within the first FPGA on the respective signal;
         an inter-FPGA travel time for an inter-chip portion of the each communication path between the first FPGA to the second FPGA; and
         a second intra-FPGA travel time corresponding to time required to perform one or more logical operations within the second FPGA on the respective signal;
      integrating one or more serializers and one or more deserializers into the first and second FPGAs to multiplex selected ones of the subset of communication paths, wherein one or more of the selected communication paths have lower travel time and higher degree of multiplexing than one or more non-selected communication paths of the subset of communication paths; and
      configuring the electronic board to implement the ASIC netlist and the integrated serializer(s) and deserializer(s).

2. The automated method of claim 1, wherein the first and second intra-FPGA travel times are based on a standard delay value per logic cell traversed by the each communication path within the first and second FPGAs respectively.

3. The automated method of claim 1, further comprising, subsequent to the integrating and prior to the configuring, performing static timing analysis of the netlist of the ASIC and the integrated serializer(s) and deserializer(s).

4. The automated method of claim 3, wherein delays determined from the static timing analysis are integrated into the synchronization graph.

5. The automated method of claim 1, further comprising repeating the travel time determination for a multiplexed communication path incorporating a first serializer of the integrated serializers and a first deserializer of the integrated deserializer, wherein the first serializer and the first deserializer are treated as combinational components.

6. The automated method of claim 5, wherein the multiplexed communication path is part of a group of communication paths sharing the first serializer and, for the repeated travel time determination, the inter-FPGA travel time further includes a first delay at the first serializer which is dependent on a processing rank of the multiplexed communication path among the group of communication paths.

7. The automated method of claim 5, wherein the multiplexed communication path is part of a group of communication paths sharing the first deserializer and, for the repeated travel time determination, the inter-FPGA travel time further includes a second delay at the first deserializer which is dependent on a processing rank of the multiplexed communication path among the group of communication paths.

8. The automated method of claim 5, wherein the multiplexed communication path is part of a group of communication paths sharing the first serializer and/or sharing the first deserializer, and further comprising, in at least one case:
   determining a synchronization violation of the multiplexed communication path; and
   changing a processing rank of the multiplexed communication path among the group of communication paths.

9. The automated method of claim 8, wherein determining the synchronization violation comprises determining that the respective signal on the multiplexed communication path arrives too late at the second FPGA over the multiplexed communication path, and wherein the processing rank is advanced to be processed earlier.

10. The automated method of claim 8, wherein determining the synchronization violation comprises determining that the respective signal on the multiplexed communication path arrives too early at the second FPGA over the multiplexed communication path, and wherein the processing rank is delayed to be processed later.

11. The automated method of claim 8, further comprising verifying that the changing of processing rank results in clearing of the synchronization violation.

12. The automated method of claim 5, wherein the repeated travel time determination for a multiplexed communication path comprises, for a first signal of the respective signals on the multiplexed communication path:
  determining a first instant at which the first signal is emitted from the first FPGA; and
  determining a second instant at which the first signal is delivered to the second FPGA.

13. The automated method of claim 1, wherein the act of combining the first intra-FPGA travel time, the inter-FPGA travel time, and the second intra-FPGA travel time comprises summing the first intra-FPGA travel time, the inter-FPGA travel time, and the second intra-FPGA travel time.

14. The automated method of claim 1, wherein the inter-FPGA travel time is based on a length of the each communication path between the first FPGA and the second FPGA and on a corresponding signal transfer speed.

15. The automated method of claim 1, wherein the integrated serializer(s) and deserializer(s) are incorporated in the synchronization graph.

16. The automated method of claim 1, wherein at least one of the integrated serializers and at least one of the integrated deserializers are driven by a fast clock which has a higher frequency than a base clock of the electronic board.

17. The automated method of claim 1, wherein a portion of content of the first FPGA and a portion of content of the second FPGA are excluded from the synchronization graph.

18. A system for developing a multi-FPGA prototype of an application-specific integrated circuit (ASIC), wherein the multi-FPGA prototype is implemented on an electronic board having a plurality of FPGA-type programmable chips (FPGAs) including a first FPGA and a second FPGA, the system comprising:
  one or more computers configured to:
    segment a netlist of the ASIC according to a number of the plurality FPGAs;
    construct a synchronization graph having a plurality of edges which correspond to communication paths of the netlist from respective originating sequential cells to respective destination sequential cells;
    in at least one case where a subset of the communication paths being communicated between the first and second FPGAs exceeds a number of physical connections between the first and second FPGAs on the electronic board:
      determine travel times of each of the subset of the communication paths for respective signals by combining:
        a first intra-FPGA travel time corresponding to time required to perform one or more logical operations within the first FPGA on the respective signal;
        an inter-FPGA travel time for an inter-chip portion of the each communication path between the first FPGA to the second FPGA; and
        a second intra-FPGA travel time corresponding to time required to perform one or more logical operations within the second FPGA on the respective signal;
      integrate one or more serializers and one or more deserializers into the first and second FPGAs to multiplex selected ones of the subset of communication paths, wherein one or more of the selected communication paths have a lower travel time and a higher degree of multiplexing than one or more non-selected communication paths of the subset of communication paths; and
      configure the electronic board to implement the ASIC netlist and the integrated serializer(s) and deserializer(s).

19. The system of claim 18, wherein the one or more computers are further configured to:
  repeat the travel time determination for a multiplexed communication path incorporating a first serializer of the integrated serializers and a first deserializer of the integrated deserializer;
    wherein the first serializer and the first deserializer are treated as combinational components; and
    wherein the multiplexed communication path is part of a group of communication paths sharing the first serializer and/or sharing the first deserializer; and
  in at least one case, determine a synchronization violation of the multiplexed communication path.

20. The system of claim 19, wherein the one or more computers are further configured to:
  change a processing rank of the multiplexed communication path among the group of communication paths; and
  verify that the changing of processing rank results in clearing of the synchronization violation.

* * * * *